US011560450B2

(12) United States Patent
Scheuermann et al.

(10) Patent No.: US 11,560,450 B2
(45) Date of Patent: Jan. 24, 2023

(54) ALIPHATIC-AROMATIC POLYESTER HAVING ELEVATED WHITENESS INDEX

(71) Applicant: BASF SE, Ludwigshafen am Rhein (DE)

(72) Inventors: Klaus Scheuermann, Ludwigshafen am Rhein (DE); Robert Loos, Ludwigshafen am Rhein (DE); Andreas Garbe, Ludwigshafen am Rhein (DE); Kevin Müller, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 494 days.

(21) Appl. No.: 16/617,640

(22) PCT Filed: May 22, 2018

(86) PCT No.: PCT/EP2018/063309
§ 371 (c)(1),
(2) Date: Nov. 27, 2019

(87) PCT Pub. No.: WO2018/219708
PCT Pub. Date: Dec. 6, 2018

(65) Prior Publication Data
US 2020/0115493 A1    Apr. 16, 2020

(30) Foreign Application Priority Data
May 31, 2017 (EP) .................................... 17173697

(51) Int. Cl.
C08G 63/183 (2006.01)
C08K 5/29 (2006.01)
D01F 6/84 (2006.01)
D01F 6/92 (2006.01)

(52) U.S. Cl.
CPC .............. *C08G 63/183* (2013.01); *C08K 5/29* (2013.01); *D01F 6/84* (2013.01); *D01F 6/92* (2013.01); *D10B 2331/04* (2013.01)

(58) Field of Classification Search
USPC ........................................ 428/323, 328, 364
See application file for complete search history.

(56) References Cited

U.S. PATENT DOCUMENTS

| | | | |
|---|---|---|---|
| 5,779,986 A | 7/1998 | van Endert et al. | |
| 6,120,895 A * | 9/2000 | Kowitz | C08G 18/791 528/80 |
| 6,812,321 B1 | 11/2004 | Heitz et al. | |
| 7,115,701 B2 | 10/2006 | Schultz Van Endert et al. | |
| 7,608,225 B2 | 10/2009 | Schulz Van Endert et al. | |
| 10,202,712 B2 | 2/2019 | Baum et al. | |
| 2012/0059142 A1 | 3/2012 | Graf et al. | |
| 2012/0180232 A1 † | 7/2012 | Baum | |
| 2012/0202928 A1 † | 8/2012 | Loos et al. | |
| 2013/0018142 A1 † | 1/2013 | Alidedeoglu | |
| 2014/0128514 A1 † | 5/2014 | Witt | |
| 2018/0319974 A1 | 11/2018 | Smit et al. | |

FOREIGN PATENT DOCUMENTS

| | | |
|---|---|---|
| CN | 102007159 A | 4/2011 |
| CN | 102471942 A | 5/2012 |
| CN | 103703049 B | 4/2016 |
| DE | 19929790 A1 | 1/2001 |
| EP | 719582 A2 | 7/1996 |
| WO | WO-9812242 A1 | 3/1998 |
| WO | WO1998012242 A1 * | 3/1998 |
| WO | WO-2003042278 A1 | 5/2003 |
| WO | WO-200542615 A1 | 5/2005 |
| WO | WO-2011012598 A1 | 2/2011 |
| WO | WO-2012031997 A1 | 3/2012 |
| WO | 2013/012705 A1 | 1/2013 |
| WO | WO-2018206352 A1 | 11/2018 |
| WO | WO-2018210608 A1 | 11/2018 |
| WO | WO-2018219714 A1 | 12/2018 |

OTHER PUBLICATIONS

WO1998012242A1 Machine Translation; Biodegradable polyesters (Year: 1998).*
International Search Report for PCT/EP2018/063309 dated Jul. 18, 2018.
Written Opinion of the International Searching Authority for PCT/EP2018/063309 dated Jul. 18, 2018.

* cited by examiner
† cited by third party

*Primary Examiner* — Terressa Boykin
(74) *Attorney, Agent, or Firm* — Faegre Drinker Biddle & Reath LLP

(57) ABSTRACT

The present invention relates to an aliphatic-aromatic polyester having a whiteness index according to ASTM E 313-73 of at least 25, to a process for preparation thereof and to the use of the aliphatic-aromatic polyester for production of polyester fibers (PF). The present invention further relates to the polyester fibers (PF) comprising the aliphatic-aromatic polyester.

15 Claims, No Drawings

ALIPHATIC-AROMATIC POLYESTER HAVING ELEVATED WHITENESS INDEX

CROSS-REFERENCE TO RELATED APPLICATIONS

This application is a national stage application (under 35 U.S.C. § 371) of PCT/EP2018/063309, filed May 22, 2018, which claims benefit of European Application No. 17173697.8, filed May 31, 2017, both of which are incorporated herein by reference in their entirety.

The present invention relates to an aliphatic-aromatic polyester having a whiteness index according to ASTM E 313-73 of at least 25, to a process for preparation thereof and to the use of the aliphatic-aromatic polyester for production of polyester fibers (PF). The present invention further relates to the polyester fibers (PF) comprising the aliphatic-aromatic polyester.

Polyesters are generally polymers having ester functions —[—CO—O—]— in their main chain. They are typically prepared by ring-opening polymerization of lactones or by polycondensation of hydroxycarboxylic acids or diols and dicarboxylic acids/dicarboxylic acid derivatives. Of particular importance are the aromatic polyesters which, in the form of polyester fibers, find use in the textile industry.

Polyester fibers are typically produced by the melt spinning method. Heating gives rise to a melt which is extruded through spinnerets. Typically, the polymer mixture from which the polyester fibers are produced comprises polyethylene terephthalate (PET) and/or polybutylene terephthalate (PBT). Polyethylene terephthalate (PET) and polybutylene terephthalate (PBT) are notable for a high whiteness index according to CIE 15.3 (2004) in the range from 70 to 85, and for that reason the polyester fibers produced therefrom can be colored very efficiently.

The polyester fibers are usually colored by the use of disperse dyes present in the form of pigments, usually in aqueous formulation in disperse dyes, by the exhaust or thermosol process at temperatures that are typically higher than 130° C.

WO 98/12242 A1 discloses a process for preparing biodegradable polyesters, in which, in a first step, a polyester comprising, as monomeric units, a mixture of 20 to 95 mol % of at least one aliphatic or cycloaliphatic dicarboxylic acid or ester-forming derivative thereof, 5 to 80 mol % of at least one aromatic dicarboxylic acid or ester-forming derivative thereof and at least one dihydroxyl compound or at least one amino alcohol or mixtures thereof is prepared. In a second step, 95 to 99.9 mol % of this polyester is reacted with 0.01 to 5 mol % of a mixture of one at least monocyclic isocyanate, one at least bicyclic isocyanate, one at least tricyclic isocyanate and one at least tetracyclic or higher polycyclic isocyanate.

WO 2012/031997 A1 discloses a process for preparing polyester alcohols by condensation of polytetrahydrofuran with aromatic dicarboxylic acids and/or anhydrides thereof and/or esters thereof in the presence of a transesterification catalyst in a multistage mode of operation, wherein phosphoric acid is used to deactivate the catalyst after the polycondensation.

WO 2011/012598 A1 relates to a process for producing spinnable and colorable polyester fibers which comprise a terephthalate polyester and a polyester-containing additive and can be colored in a light- and washfast manner even at temperatures below 130° C., which can achieve an energy and cost saving. The polyester-containing additive is an aliphatic-aromatic polyester which is obtained by condensation of a dicarboxylic acid component and a diol component in the presence of a titanium catalyst. The dicarboxylic acid component comprises both an aliphatic and an aromatic dicarboxylic acid (derivative).

However, it has been found that, when adipic acid, the least expensive aliphatic dicarboxylic acid, is used, and when the derivatives of adipic acid are used, together with a titanium catalyst, the resulting aliphatic-aromatic polyester and hence the polyester fibers produced therewith have a yellow to orange color. Particularly for the coloring of the polyester fibers, however, it is extremely important that the polyesters used and the polyester fibers produced therefrom have a high whiteness index.

There is therefore a need for an aliphatic-aromatic polyester which can be used as polyester-containing additive in the production of polyester fibers and which enables the coloring of the polyester fibers at temperatures below 130° C. and which simultaneously has a sufficient whiteness index to assure optimal coloring of the polyester fibers produced therefrom. Furthermore, it should be preparable in a simple and inexpensive manner.

The objective technical problem underlying the present invention is thus that of providing a novel aliphatic-aromatic polyester, or that of providing a process for production thereof.

This problem is solved by an aliphatic-aromatic polyester obtainable by condensation at least of components (A), (B), (C) and optionally (D):
(A) 40 to 70 mol %, based on components (A) and (B), of adipic acid and/or at least one adipic acid derivative,
(B) 30 to 60 mol %, based on components (A) and (B), of at least one aromatic 1,ω-dicarboxylic acid and/or at least one 1,ω-dicarboxylic acid derivative,
(C) 98 to 102 mol %, based on components (A) and (B), of at least one aliphatic 1,ω-diol, and
(D) 0% to 5% by weight, based on the total weight of components (A) to (C), of at least one chain extender, wherein the aliphatic-aromatic polyester has a whiteness index according to ASTM E 313-73 of at least 25.

The aliphatic-aromatic polyester is preferably prepared by means of a process in which
i) in a first stage a mixture comprising components (A), (B) and (C) is continuously esterified in the presence of a catalyst to obtain an esterification product,
ii) in a second stage the esterification product obtained in the first stage is continuously precondensed up to a viscosity number according to DIN 53728 of 20 to 70 cm$^3$/g to obtain a precondensation product,
iii) in a third stage the precondensation product obtained in the second stage is continuously postcondensed up to a viscosity number according to DIN 53728 of 60 to 170 cm$^3$/g to obtain a postcondensation product, and
iv) in a fourth stage the postcondensation product obtained in the third stage is continuously reacted in a polyaddition reaction with the at least one chain extender (D) up to a viscosity number according to DIN 53728 of 100 to 300 cm$^3$/g to obtain the aliphatic-aromatic polyester,
where 0.03% to 0.04% by weight of a phosphorus compound is added to the precondensation product obtained in the second stage after process step ii) and before and/or during process step iii), based on the total weight of the precondensation product.

It has been found that, surprisingly, the addition of 0.03% to 0.04% by weight of a phosphorus compound during the process for preparing the aliphatic-aromatic polyester of the invention causes it to have an elevated whiteness index of at least 25 according to ASTM E 313-73, which assures lightand washfast coloring of the polyester fibers produced therefrom. The polyester fibers produced therefrom additionally have a broad color spectrum to choose from in use, good rubfastnesses and very good washfastnesses.

A further advantage is that the polyester fibers produced therefrom can be colored at very low temperatures, i.e. below 130° C., which lowers the energy demand and saves time. Moreover, the material to be colored is treated gently and is supple and smooth even after the coloring.

It has additionally been found that, surprisingly, the aliphatic-aromatic polyester of the invention, in spite of an elevated acid number, owing to the amount of a phosphorus compound added in the course of the preparation process, has a high viscosity number. Chain extension with isocyanates thus does not lead to unwanted specks, but to buildup of a high molecular weight. In a subsequent melt spinning process, the polyester fibers therefore do not break, but have a high breaking strength and stability.

Specks normally arise when the acid number of the postcondensation product (the aliphatic-aromatic polyester before the chain extension) is too high. The high acid number makes the melt inhomogeneous, meaning that a portion of the isocyanates used for chain extension is not incorporated into the polymer chain but is in the form of solid grains in gel form (called specks). Owing to the specks, the fibers would break in a subsequent melt spinning process.

There follows a detailed elucidation of the aliphatic-aromatic polyester and the process for preparation thereof.

Aliphatic-Aromatic Polyester

The aliphatic-aromatic polyester of the invention is obtainable by condensation at least of components (A), (B), (C) and optionally (D).

"Condensation" in the context of the present invention is preferably understood to mean a process comprising the four stages i) to iv): a continuous esterification (stage i)), a precondensation (stage ii)), a postcondensation (stage iii)) and a polyaddition reaction (stage iv)).

The condensation is elucidated in detail further down in the description in connection with the process for preparing the aliphatic-aromatic polyester.

Component (A)

Component (A) is adipic acid and/or at least one adipic acid derivative.

The terms adipic acid and/or at least one adipic acid derivative and component (A) are used synonymously in the context of the present invention and have the same meaning. Furthermore, in the context of the present invention, the term "at least one adipic acid derivative" is understood to mean exactly one adipic acid derivative and mixtures of two or more adipic acid derivatives. In a preferred embodiment, exactly one adipic acid derivative is used in the condensation.

In a further preferred embodiment, a mixture of adipic acid and at least one adipic acid derivative is used in the condensation.

In a particularly preferred embodiment, adipic acid only is used in the condensation.

Component (A) is used in amounts of at least 40 mol %, preferably of at least 45 mol %, more preferably of at least 50 mol %, based on components (A) and (B).

In addition, component (A) is used in amounts of at most 70 mol %, preferably of at most 65 mol %, more preferably of at most 63 mol %, based on components (A) and (B).

Component (A) is used in amounts of 40 to 70 mol %, preferably of 45 to 65 mol %, more preferably of 50 to 63 mol %, based on components (A) and (B).

Adipic acid derivatives are known in principle to the person skilled in the art.

In the context of the present invention, the adipic acid derivative is preferably an adipic ester. This adipic ester may be used individually and also as a mixture of two or more esters of adipic acid.

Examples of useful adipic esters here include the di-$C_1$-$C_6$-alkyl esters of adipic acid, for example the dimethyl, diethyl, di-n-propyl, diisopropyl, di-n-butyl, diisobutyl, di-t-butyl, di-n-pentyl, diisopentyl or di-n-hexyl esters of adipic acid.

Component (B)

Component (B) is at least one aromatic 1,ω-dicarboxylic acid and/or at least one aromatic 1,ω-dicarboxylic acid derivative.

The terms at least one aromatic 1,ω-dicarboxylic acid and/or at least one aromatic 1,ω-dicarboxylic acid derivative and component (B) are used synonymously in the context of the present invention and have the same meaning.

In addition, in the context of the present invention, the term "at least one aromatic 1,ω-dicarboxylic acid" is understood to mean exactly one aromatic 1,ω-dicarboxylic acid and mixtures of two or more aromatic 1,ω-dicarboxylic acids.

In the context of the present invention, the term "at least one aromatic 1,ω-dicarboxylic acid derivative" is likewise understood to mean exactly one aromatic 1,ω-dicarboxylic acid derivative and mixtures of two or more aromatic 1,ω-dicarboxylic acid derivatives. In a preferred embodiment, exactly one aromatic 1,ω-dicarboxylic acid derivative is used in the condensation.

In a further preferred embodiment, a mixture of an aromatic 1,ω-dicarboxylic acid and an aromatic 1,ω-dicarboxylic acid derivative is used in the condensation.

In a particularly preferred embodiment, exactly one aromatic 1,ω-dicarboxylic acid is used in the condensation.

Component (B) is used in amounts of at least 30 mol %, preferably of at least 35 mol %, more preferably of at least 37 mol %, based on components (A) and (B).

In addition, component (B) is used in amounts of at most 60 mol %, preferably of at most 55 mol %, more preferably of at most 50 mol %, based on components (A) and (B).

Component (B) is used in amounts of 30 to 60 mol %, preferably of 35 to 55 mol %, more preferably of 37 to 50 mol %, based on components (A) and (B).

Aromatic 1,ω-dicarboxylic acids and aromatic 1,ω-dicarboxylic acid derivatives are known in principle to those skilled in the art.

Suitable aromatic 1,ω-dicarboxylic acids are terephthalic acid, isophthalic acid, 2,6-naphthoic acid, furandicarboxylic acid or 1,5-naphthoic acid.

In the context of the present invention, the aromatic 1,ω-dicarboxylic acid is preferably an aromatic 1,ω-dicarboxylic acid having 8 to 12 carbon atoms, preferably one having 8 carbon atoms. The aromatic 1,ω-dicarboxylic acid may be linear or branched.

In the context of the present invention, preferred 1,ω-dicarboxylic acid derivatives are the esters of the aromatic 1,ω-dicarboxylic acids. It is possible here for the esters of the aromatic 1,ω-dicarboxylic acids to be used individually or else as a mixture of two or more esters of the aromatic 1,ω-dicarboxylic acids.

Useful esters of the aromatic 1,ω-dicarboxylic acids here include the di-$C_1$-$C_6$-alkyl esters of the aromatic 1,ω-dicarboxylic acids, for example the dimethyl, diethyl, di-n- propyl, diisopropyl, di-n-butyl, diisobutyl, di-t-butyl, di-n-pentyl, diisopentyl or di-n-hexyl esters of the aromatic 1,ω-dicarboxylic acids.

In a preferred embodiment of the present invention, component (B) is terephthalic acid and/or a terephthalic acid derivative.

The present invention thus also provides an aliphatic-aromatic polyester in which component (B) is terephthalic acid and/or a terephthalic acid derivative.

In a particularly preferred embodiment of the present invention, component (B) is terephthalic acid.

Component (C)

Component (C) is at least one aliphatic 1,ω-diol.

The terms at least one aliphatic 1,ω-diol and component (C) are used synonymously in the context of the present invention and have the same meaning. In addition, in the context of the present invention, the term at least one aliphatic 1,ω-diol is understood to mean exactly one aliphatic 1,ω-diol and mixtures of two or more aliphatic 1,ω-diols. In a preferred embodiment, exactly one aliphatic 1,ω-diol is used in the process of the invention.

The aliphatic-aromatic polyester comprises at least 98 mol %, preferably at least 99 mol %, based on components (A) and (B), of component (C) in condensed form.

In addition, the aliphatic-aromatic polyester comprises at most 102 mol %, preferably at most 101 mol %, based on components (A) and (B), of component (C) in condensed form.

The aliphatic-aromatic polyester comprises from 98 to 102 mol %, preferably from 99 to 101 mol %, based on components (A) and (B), of component (C) in condensed form.

During the condensation, i.e. during the preparation of the aliphatic-aromatic polyester, component (C), however, is preferably used in excess, meaning that it is preferably used in amounts of greater than 100 mol %, more preferably in amounts of greater than 120 mol %, based on components (A) and (B).

Aliphatic 1,ω-diols are known in principle to the person skilled in the art.

Suitable aliphatic 1,ω-diols are ethylene glycol, propane-1,3-diol, butane-1,4-diol, pentane-1,5-diol, hexane-1,6-diol, 2,2-dimethylpropane-1,3-diol, 2-ethyl-2-butylpropane-1,3-diol, 2-ethyl-2-isobutylpropane-1,3-diol or 2,2,4-trimethylhexane-1,6-diol.

In the context of the present invention, the aliphatic 1,ω-diol is preferably an aliphatic 1,ω-diol having 2 to 12, preferably having 4 to 6, carbon atoms. The aliphatic 1,ω-diol may be linear or branched.

Particularly preferred aliphatic 1,ω-diols are propane-1,3-diol, butane-1,4-diol, pentane-1,5-diol and hexane-1,6-diol.

In a particularly preferred embodiment, component (C) is propane-1,3-diol and/or butane-1,4-diol.

The present invention thus also provides an aliphatic-aromatic polyester in which component (C) is propane-1,3-diol and/or butane-1,4-diol.

Component (D)

The optional component (D) is at least one chain extender.

The terms at least one chain extender and component (D) are used synonymously in the context of the present invention and have the same meaning. In addition, in the context of the present invention, the term "at least one chain extender" is understood to mean exactly one chain extender and also mixtures of two or more chain extenders.

If component (D) is used, it is preferably used in amounts of at least 0.01% by weight, preferably in amounts of at least 0.05% by weight, more preferably in amounts of at least 0.1% by weight, based on the total weight of components (A) to (C).

In addition, component (D) is used in amounts of at most 5% by weight, preferably in amounts of at most 3% by weight, more preferably in amounts of at most 2% by weight, based on the total weight of components (A) to (C).

If component (D) is used, in a preferred embodiment, it is used in amounts in the range from 0.01% to 5% by weight, preferably in amounts of 0.05% to 3% by weight, more preferably in amounts of 0.1% to 2% by weight, based on the total weight of components (A) to (C).

The at least one chain extender is preferably selected from the group consisting of compounds comprising at least three groups capable of ester formation (D1), and of compounds comprising at least two isocyanate groups (D2).

The compounds (D1) comprise preferably 3 to 10 functional groups capable of forming ester bonds. Particularly preferred compounds (D1) have 3 to 6 functional groups capable of formation of ester bonds in the molecule, especially 3 to 6 hydroxyl groups and/or carboxyl groups.

Examples of the compounds (D1) are tartaric acid, citric acid, malic acid, trimethylolpropane, trimethylolethane, pentaerythritol, polyethertriols, glycerol, trimesic acid, trimellitic acid, trimellitic anhydride, pyromellitic acid, pyromellitic dianhydride or hydroxyisophthalic acid.

The compounds (D2) preferably comprise a diisocyanate or a mixture of different diisocyanates. It is possible to use aromatic or aliphatic diisocyanates. It is alternatively possible to use higher-functionality isocyanates.

Suitable "aromatic diisocyanates" are selected from the group consisting of tolylene 2,4-diisocyanate, tolylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate and xylylene diisocyanate.

In the context of the present invention, preferred aromatic diisocyanates are diphenylmethane 2,2'-diisocyanate, diphenylmethane 2,4'-diisocyanate and diphenylmethane 4,4'-diisocyanate; particular preference is given to using these diphenylmethane diisocyanates as mixtures.

Preferably, the compounds (D2) comprise up to 5% by weight, based on the total weight of the compound (D2), of uretdione groups. These serve, for example, to cap the isocyanate groups.

The compounds (D2) may also comprise a tricyclic aromatic diisocyanate. One example of a tricyclic aromatic isocyanate is tri(4-isocyanophenyl)methane. The polycyclic aromatic diisocyanates are obtained, for example, in the preparation of mono- or bicyclic aromatic diisocyanates.

In the context of the present invention, an "aliphatic diisocyanate" is understood in particular to mean linear or branched alkylene diisocyanates or cycloalkylene diisocyanates having 2 to 20 carbon atoms, preferably having 3 to 12 carbon atoms, for example hexamethylene 1,6-diisocyanate, pentamethylene 1,5-diisocyanate, isophorone diisocyanate or methylenebis(4-isocyanatocyclohexane). Particularly preferred aliphatic diisocyanates are hexamethylene 1,6-diisocyanate and isophorone diisocyanate.

Alternatively, it is possible to use aliphatic diisocyanates based on N-hexamethylene diisocyanate, for example cyclic trimers, pentamers or higher oligomers of N-hexamethylene diisocyanate.

In the context of the present invention, component (D) is preferably hexamethylene diisocyanate.

The present invention thus also provides an aliphatic-aromatic polyester in which component (D) is hexamethylene diisocyanate.

The aliphatic-aromatic polyester of the invention has a whiteness index according to ASTM E 313-73 of at least 25.

Preferably, the aliphatic-aromatic polyester has a whiteness index according to ASTM E 313-73 in the range from 25 to 40, preferably in the range from 28 to 35, more preferably in the range from 30 to 35.

The "whiteness index" in the context of the present invention is understood to mean the numerical measure of the reflectance capacity of the aliphatic-aromatic polyester or of the polyester fibers (PF). It serves as a quality feature and is determined by calorimetric, photometric or spectrophotometric test methods. A low whiteness index means that the aliphatic-aromatic polyester has, or the polyester fibers (PF) have, a yellow color. A high whiteness index means that the aliphatic-aromatic polyester has, or the polyester fibers (PF) have, a slight yellow color, if any, and hence have a whiter appearance. The whiteness index of the aliphatic-aromatic polyester in the context of the present invention is determined according to ASTM E 313-73, and the whiteness index of the polyester fibers (PF) according to CIE 15.3 (2004).

The present invention thus also provides an aliphatic-aromatic polyester in which the aliphatic-aromatic polyester has a whiteness index according to ASTM E 313-73 of 25 to 40.

The aliphatic-aromatic polyester typically has an acid number measured according to DIN EN ISO 2114:2002-06 in the range from 1.1 to 1.4 mg KOH/g. The solvent mixture used for 1 g of polymer is 15 mL of 1,2-dichlorobenzene, in which the polyester is dissolved at 180° C. and then diluted with 20 mL of pyridine. Cooling to 60° C. and addition of 50 mL of tetrahydrofuran (THF), 5 mL of water and 40 mL of ethanol are followed by potentiographic titration with 0.1 M ethanolic potassium hydroxide solution with an end point indicator.

The present invention thus also provides an aliphatic-aromatic polyester in which the aliphatic-aromatic polyester has an acid number measured according to DIN EN ISO 2114:2002-06 in the range from 1.1 to 1.4 mg KOH/g.

The aliphatic-aromatic polyester typically has a viscosity number in the range from 100 to 300 cm$^3$/g, preferably in the range from 120 to 220 cm$^3$/g, more preferably in the range from 150 to 210 cm$^3$/g. The viscosity number is determined in a solution of 0.5 g of the aliphatic-aromatic polyester in 100 mL of a 1:1 mixture of phenol and o-dichlorobenzene.

The present invention thus also provides an aliphatic-aromatic polyester in which the aliphatic-aromatic polyester has a viscosity number according to DIN 53728 in the range from 100 to 300 cm$^3$/g.

The aliphatic-aromatic polyester typically has a glass transition temperature $T_G$. The glass transition temperature $T_G$ of the aliphatic-aromatic polyester is typically in the range from −50 to 0° C., preferably in the range from −45 to −10° C. and especially preferably in the range from −40 to −20° C., determined by differential scanning calorimetry (DSC) at a heating and cooling rate of 10° C./min.

The present invention thus also provides an aliphatic-aromatic polyester, in which the glass transition temperature ($T_G$) of the aliphatic-aromatic polyester is in the range from −50 to 0° C.

Typically, the aliphatic-aromatic polyester has a melt volume flow rate (MVR) measured according to ISO 1133 in the range from 0.5 to 40 cm$^3$/10 min, preferably in the range from 1 to 20 cm$^3$/10 min, more preferably in the range from 1.5 to 10 cm$^3$/10 min. The testing temperature here is 190° C. and the test load is 2.19 kg. The melting time is 4 minutes.

The aliphatic-aromatic polyesters are typically random copolymers, meaning that components (A) and (B) are incorporated purely randomly. The distribution of the length of the individual blocks can be calculated according to B. Vollmert, Grundriss der makromolekularen Chemie [Basics of Macromolecular Chemistry].

The weight-average molecular weight ($M_w$) of the aliphatic-aromatic polyester is typically in the range from 50 000 to 300 000 g/mol, preferably in the range from 50 000 to 150 000 g/mol, determined by means of gel permeation chromatography (GPC) (Size Exclusion Chromatography (SEC)) according to ASTM D4001. The solvent used is 1,1,1,3,3,3-hexafluoro-2-propanol against narrow-distribution polymethylmethacrylate (PMMA) standards.

The number-average molecular weight ($M_n$) of the aliphatic-aromatic polyester is typically in the range from 5000 to 60 000 g/mol, preferably in the range from 15 000 to 40 000 g/mol and especially preferably in the range from 20 000 to 40 000 g/mol, determined by means of gel permeation chromatography (GPC) (Size Exclusion Chromatography (SEC)) according to ASTM D4001. The solvent used is 1,1,1,3,3,3-hexafluoro-2-propanol against narrow-distribution polymethylmethacrylate (PMMA) standards.

The $M_w/M_n$ ratio is typically in the range from 1 to 6, preferably in the range from 3 to 6. The aliphatic-aromatic polyester generally has a melting temperature ($T_M$) in the range from 90 to 150° C., preferably in the range from 100 to 140° C., determined by differential scanning calorimetry (DSC) at a heating and cooling rate of 10° C./min.

The aliphatic-aromatic polyester preferably comprises at least components (A), (B), (C) and optionally (D):
(A) 40 to 70 mol %, based on components (A) and (B), of adipic acid and/or at least one adipic acid derivative,
(B) 30 to 60 mol %, based on components (A) and (B), of at least one aromatic 1,ω-dicarboxylic acid and/or at least one 1,ω-dicarboxylic acid derivative,
(C) 98 to 102 mol %, based on components (A) and (B), of at least one aliphatic 1,ω-diol, and
(D) 0% to 5% by weight, based on the total weight of components (A) to (C), of at least one chain extender, in condensed form.

Preferably, the aliphatic-aromatic polyester is obtainable by condensation at least of components (A), (B), (C) and optionally (D):
(A) 45 to 65 mol %, based on components (A) and (B), of adipic acid and/or at least one adipic acid derivative,
(B) 35 to 55 mol %, based on components (A) and (B), of at least one aromatic 1,ω-dicarboxylic acid and/or at least one 1,ω-dicarboxylic acid derivative,
(C) 99 to 101 mol %, based on components (A) and (B), of at least one aliphatic 1,ω-diol, and
(D) 0.01% to 5% by weight, based on the total weight of components (A) to (C), of at least one chain extender.

The present invention thus also provides an aliphatic-aromatic polyester in which the aliphatic-aromatic polyester is obtainable by condensation at least of components (A), (B), (C) and optionally (D):
(A) 45 to 65 mol %, based on components (A) and (B), of adipic acid and/or at least one adipic acid derivative,
(B) 35 to 55 mol %, based on components (A) and (B), of at least one aromatic 1,ω-dicarboxylic acid and/or at least one 1,ω-dicarboxylic acid derivative,
(C) 99 to 101 mol %, based on components (A) and (B), of at least one aliphatic 1,ω-diol, and (D) 0.01% to 5% by weight, based on the total weight of components (A) to (C), of at least one chain extender.

The present invention thus also provides an aliphatic-aromatic polyester comprising at least components (A), (B), (C) and optionally (D):
(A) 45 to 65 mol %, based on components (A) and (B), of adipic acid and/or at least one adipic acid derivative,
(B) 35 to 55 mol %, based on components (A) and (B), of at least one aromatic 1,ω-dicarboxylic acid and/or at least one 1,ω-dicarboxylic acid derivative,
(C) 99 to 101 mol %, based on components (A) and (B), of at least one aliphatic 1,ω-diol, and
(D) 0.01% to 5% by weight, based on the total weight of components (A) to (C), of at least one chain extender,
in condensed form.

The aliphatic-aromatic polyester is preferably prepared by means of a process in which
i) in a first stage a mixture comprising components (A), (B) and (C) is continuously esterified in the presence of a catalyst to obtain an esterification product,
ii) in a second stage the esterification product obtained in the first stage is continuously precondensed up to a viscosity number according to DIN 53728 of 20 to 70 cm$^3$/g to obtain a precondensation product,
iii) in a third stage the precondensation product obtained in the second stage is continuously postcondensed up to a viscosity number according to DIN 53728 of 60 to 170 cm$^3$/g to obtain a postcondensation product, and
iv) in a fourth stage the postcondensation product obtained in the third stage is continuously reacted in a polyaddition reaction with the at least one chain extender (D) up to a viscosity number according to DIN 53728 of 100 to 300 cm$^3$/g to obtain the aliphatic-aromatic polyester,
where 0.03% to 0.04% by weight of a phosphorus compound is added to the precondensation product obtained in the second stage after process step ii) and before and/or during process step iii), based on the total weight of the precondensation product.

The present invention thus also provides the aliphatic-aromatic polyester obtainable by the above process.

Process for Preparing the Aliphatic-Aromatic Polyester

In respect of the process of the invention for preparing the aliphatic-aromatic polyester, the aforementioned details and preferences for the aliphatic-aromatic polyester are correspondingly applicable.

Stage i)

In a first stage (stage i)), a mixture comprising components (A), (B) and (C) is continuously esterified in the presence of a catalyst to obtain an esterification product.

Components (A), (B) and (C) are preferably mixed here in a preceding stage prior to stage i) to obtain a mixture. The mixing of components (A), (B) and (C) can be conducted in all mixing apparatuses known to those skilled in the art.

If component (A) is adipic acid and component (B) is at least one aromatic 1,ω-dicarboxylic acid, components (A), (B) and (C) are preferably mixed at a temperature of 20 to 70° C. to obtain a mixture.

If component (A) is an adipic ester and/or component (B) is at least one 1,ω-dicarboxylic ester, components (A), (B) and (C) are preferably mixed at a temperature of 140 to 200° C. to obtain a mixture.

Alternatively, component (A) or component (B) can be esterified with component (C) to give a polyester and this can then be mixed with the respective other component (B) or (A) to obtain a mixture.

"Esterification" in the context of the present invention is understood to mean either a "straight esterification" or a "transesterification".

A "straight esterification" in the context of the present invention is understood to mean the reaction of at least one diol with at least one dicarboxylic acid to form a (poly)ester and water.

A "transesterification" in the context of the present invention is understood to mean a reaction in which one ester is converted to another. The transesterification can be effected either by reaction of an ester group with a hydroxyl group and/or by reaction of two ester groups.

The "transesterification" can be effected after the straight esterification and/or in parallel with the straight esterification.

The mixture comprising components (A), (B) and (C) is continuously esterified in the presence of a catalyst.

Catalysts used are typically zinc compounds, aluminum compounds and especially titanium compounds. Catalysts composed of titanium compounds, such as tetrabutyl orthotitanate or tetra(isopropyl) orthotitanate, have the advantage over the tin compounds, antimony compounds, cobalt compounds and lead compounds that are frequently used in the literature, such as tin dioctanate, that residues of the catalyst or conversion products of the catalyst that remain in the product are less toxic.

The catalyst is preferably used in amounts of at least 0.001% by weight, more preferably in amounts of at least 0.03% by weight, based on components (A), (B) and (C).

In addition, the catalyst is preferably used in amounts of at most 1% by weight, more preferably of at most 0.2% by weight, based on components (A), (B) and (C).

In stage i) it is possible to use either the entirety or a portion of the catalyst. Preference is given to using a portion of the catalyst. The remaining portion of catalyst is then preferably used in stage ii).

In a preferred embodiment, stages i) and ii) are conducted in the presence of a titanium catalyst.

The present invention thus also provides a process in which stages i) and ii) are conducted in the presence of a titanium catalyst.

Stage i) is preferably conducted at a temperature in the range from 180 to 260° C., preferably at a temperature in the range from 220 to 250° C. and preferably at a pressure in the range from 0.6 to 1.2 bar, preferably in the range from 0.8 to 1.1 bar.

Stage i) and stage ii) are preferably conducted in a single reactor, for example a tower reactor (see WO 03/042278 and DE-A 199 29 790).

In stage i) the mixture is continuously esterified to obtain an esterification product. This is done by adding component (C) preferably in excess, preferably distilling off the excess component (C) after the esterification product has been obtained, and feeding it back to the circuit after distillative purification for example.

Stage ii)

In stage ii) the esterification product obtained in the first stage (stage i)) is precondensed up to a viscosity number according to DIN 53728 of 20 to 70 cm$^3$/g to obtain a precondensation product.

"Precondensation" in the context of the present invention is understood to mean a condensation reaction which precedes the postcondensation (stage iii)) and in which the molecules of the esterification product combine with one another with elimination of water and/or alcohol. It is generally conducted at lower temperatures and at lower pressure than the postcondensation (stage iii)), and for that reason the precondensation products have lower molecular weights compared to the postcondensation products.

The esterification product which has been obtained in the first stage (stage i)) is precondensed up to a viscosity number according to DIN 53728 of 20 to 70 cm$^3$/g to obtain a precondensation product.

The precondensation product typically has an acid number measured according to DIN EN ISO 2114:2002-06 in the range from 0.7 to 2 mg KOH/g.

Stage ii) is preferably conducted at a temperature in the range from 230 to 270° C., preferably in the range from 240 to 260° C.

On commencement of stage ii), the pressure is preferably in the range from 0.1 to 0.5 bar, preferably in the range from 0.2 to 0.4 bar; at the end of stage ii), the pressure is preferably in the range from 5 to 100 mbar, preferably in the range from 5 to 20 mbar.

Stage ii) is preferably conducted in a reactor suitable for the precondensation. Examples of such reactors are shell and tube reactors, tower reactors, tank cascades, bubble columns and downflow cascades, optionally with a degassing unit.

Particularly advantageous reactors for stage ii) have been found to be the tower reactors described in detail in WO-A 03/042278 and WO-A 05/042615, in which the product stream is guided in cocurrent through a single-stage or multistage falling-film evaporator, wherein the reaction vapors, especially water, tetrahydrofuran (THF) in the case of use of butane-1,4-diol and alcohols in the case of use of dicarboxylic esters, are drawn off at multiple points distributed over the reactor.

The reaction vapors, which preferably consist of alcohol, of excess diol and THF by-product, are typically purified by distillation and returned to the process.

Stage iii)

After process step ii) and before and/or during process step iii), 0.03% to 0.04% by weight of a phosphorus compound is added to the precondensation product obtained in the second stage (stage ii)), based on the total weight of the precondensation product.

The phosphorus compound preferably serves as deactivator for the catalyst.

Deactivators are preferably used when titanium catalysts of high reactivity are used.

In the present context, however, it has also been found that, surprisingly, addition of 0.03% to 0.04% by weight of a phosphorus compound additionally also increases the whiteness index according to ASTM E 313-73 of the aliphatic-aromatic polyester (stage iv)).

Examples of useful deactivators include phosphonous acid or phosphorous acid.

In a particularly preferred embodiment, the phosphorus compound is phosphorous acid.

The present invention thus also provides a process in which the phosphorus compound is phosphorous acid.

The titanium catalyst is preferably not fully deactivated in stage iii) by the addition of a phosphorus compound; in other words, it is in partly active form.

In stage iii) the precondensation product obtained in the second stage (stage ii)) is postcondensed up to a viscosity number according to DIN 53728 of 60 to 170 cm$^3$/g to obtain a postcondensation product.

"Postcondensation" in the context of the present invention refers to a condensation reaction in which the molecules of the precondensation product combine with one another with elimination of water and/or alcohol to obtain the postcondensation product. It is generally conducted at higher temperatures and at higher pressure than the precondensation (stage ii)), and for that reason the postcondensation products have higher molecular weights compared to the precondensation products.

The postcondensation product typically has an acid number measured according to DIN EN ISO 2114:2002-06 in the range from 0.8 to 1.5 mg KOH/g, preferably in the range from 1.0 to 1.4 mg KOH/g.

Stage iii) is preferably conducted at a temperature of 220 to 270° C., preferably of 230 to 250° C., and preferably at a pressure of 0.2 to 5 mbar, preferably of 0.5 to 3 mbar.

Stage iii) is preferably conducted in a finisher. Suitable finishers have been found to be especially reactors such as disk ring reactors and cage reactors as described in U.S. Pat. No. 5,779,986 and EP 719582.

Stage iv)

In stage iv) the postcondensation product obtained in the third stage (stage iii)) is reacted in a polyaddition reaction with the at least one chain extender (D) up to a viscosity number according to DIN 53728 of 100 to 300 cm$^3$/g to obtain the aliphatic-aromatic polyester.

Stage iv) is preferably conducted at temperatures of 220 to 270° C., preferably of 230 to 250° C., and preferably at elevated pressure or standard pressure.

The residence times are preferably in the range from 2 to 30 minutes, preferably in the range from 4 to 15 minutes.

Stage iv) is preferably conducted in an extruder, a continuous kneader (List reactor) or a static mixer. Examples of internals include the following: in a static mixer it is possible to use SMR elements, SMX elements, SMXL elements or combinations thereof, for example from Sulzer Chemtech AG, Switzerland. Examples of a List reactor, according to the field of use, are single-shaft DISKOTHERM B or twin-shaft CRP-ORP reactors. Useful extruders include 1- or 2-shaft extruders.

Polyester Fibers

The aliphatic-aromatic polyesters of the invention can be used for production of polyester fibers (PF).

The present invention thus also further provides for the use of the aliphatic-aromatic polyester for production of polyester fibers (PF).

The polyester fibers (PF) that have been produced using the aliphatic-aromatic polyester of the invention comprise, based in each case on the total weight of the polyester fibers (PF), 80% to 99% by weight of at least one terephthalate polyester, 1% to 20% by weight of at least one aliphatic-aromatic polyester according to claims 1 to 9, and 0% to 5% by weight of at least one additive (E), wherein the polyester fibers (PF) have a whiteness index according to CIE 15.3 (2004) of at least 65.

The present invention thus also further provides polyester fibers (PF) comprising, based in each case on the total weight of the polyester fibers (PF), 80% to 99% by weight of at least one terephthalate polyester, 1% to 20% by weight of at least one aliphatic-aromatic polyester according to claims 1 to 9, and 0% to 5% by weight of at least one additive (E), wherein the polyester fibers (PF) have a whiteness index according to CIE 15.3 (2004) of at least 65.

The sum total of the percentages by weight of the components present in the polyester fibers (PF) generally adds up to 100% by weight.

The at least one terephthalate polyester here is preferably polyethylene terephthalate (PET) and/or polybutylene terephthalate (PBT).

The present invention thus also further provides polyester fibers (PF) in which the at least one terephthalate polyester is polyethylene terephthalate (PET) and/or polybutylene terephthalate (PBT).

The polyester fibers (PF) preferably comprise at least 80% by weight of the at least one terephthalate polyester, preferably at least 85% by weight, based on the total weight of the polyester fibers (PF).

In addition, the polyester fibers (PF) preferably comprise at most 99% by weight of the at least one terephthalate polyester, preferably at most 95% by weight, based on the total weight of the polyester fibers (PF).

The polyester fibers (PF) comprise 80% to 99% by weight of at least one terephthalate polyester, preferably 85% to 95% by weight of at least one terephthalate polyester, based on the total weight of the polyester fibers (PF).

The polyester fibers (PF) preferably comprise at least 1% by weight of the aliphatic-aromatic polyester of the invention, preferably at least 5% by weight, based on the total weight of the polyester fibers (PF).

In addition, the polyester fibers (PF) preferably comprise at most 20% by weight of the aliphatic-aromatic polyester of the invention, preferably at most 15% by weight, more preferably at most 9% by weight, based on the total weight of the polyester fibers (PF).

The polyester fibers (PF) comprise 1% to 20% by weight of at least one aliphatic-aromatic polyester of the invention, preferably 5% to 15% by weight, more preferably 5% to 9% by weight, based on the total weight of the polyester fibers (PF).

Optionally, the polyester fibers (PF) comprise at least one additive (E).

Suitable additives are known to those skilled in the art.

Examples of additives are lubricants, nucleating agents, compatibilizers, flame retardants, reinforcing materials, plasticizers, antioxidants, UV stabilizers and pigments.

In the context of the present invention, the polyester fibers (PF) preferably comprise lubricants, nucleating agents and/or compatibilizers.

Useful lubricants or else mold release agents have been found to be especially hydrocarbons, fatty alcohols, higher carboxylic acids, metal salts of higher carboxylic acids, such as calcium stearate or zinc stearate, fatty acid amides, such as erucamide, and wax types, for example paraffin waxes, beeswaxes or montan waxes. Preferred lubricants are erucamide and/or wax types, and more preferably combinations of these lubricants. Preferred wax types are beeswaxes and ester waxes, especially glycerol monostearate or dimethylsiloxane or polydimethylsiloxane, for example Belzil and DM from Waga.

Lubricants are preferably added in amounts of 0.05% to 2% by weight, preferably in amounts of 0.1% to 1% by weight, based on the total weight of the polyester fibers (PF).

Useful nucleating agents generally include inorganic compounds such as talc, chalk, mica, silicon oxides or barium sulfate.

Preference is given to adding 0.05% to 5% by weight, preferably 0.1% to 1% by weight, of nucleating agents, based on the total weight of the polyester fibers (PF).

Advantageous compatibilizers have been found to be aliphatic polyesters such as polylactic acid, polycaprolactone, polyhydroxyalkanoate or polyglycolic acid (PGA).

The compatibilizers are preferably added in amounts of 0.1% to 5% by weight, based on the total weight of the polyester fibers (PF).

The examples which follow are intended to further illustrate the present invention, but without limiting the present invention thereto.

EXAMPLES

Test Methods

The viscosity number was determined according to DIN 53728 (Part 3, Jan. 3, 1985). The solvent used was the mixture of phenol/dichlorobenzene in a weight ratio of 50/50.

The molecular weights ($M_w$ and $M_n$) were determined according to ASTM D4001. The solvent used was 1,1,1,3,3,3-hexafluoro-2-propanol against narrow-distribution polymethylmethacrylate (PMMA) standards.

The melt volume flow rate (MVR) was determined according to ISO 1133. The testing temperature is 190° C. and the test load is 2.19 kg. The melting time is 4 minutes.

The acid number is determined according to DIN EN ISO 2114:2002-06. The solvent mixture used for 1 g of polymer is 15 mL of 1,2-dichlorobenzene, in which the polyester is dissolved at 180° C. and then diluted with 20 mL of pyridine. Cooling to 60° C. and addition of 50 mL of tetrahydrofuran (THF), 5 mL of water and 40 mL of ethanol are followed by potentiographic titration with 0.1 M ethanolic potassium hydroxide solution with an end point indicator.

The whiteness index is determined on the granules, which have a grain size of 2.5 to 4.4 g/100 of particles, according to ASTM E 313-73 by means of a Minolta CM-5 spectrophotometer. Three measurements are conducted, from which the mean is determined. A glass cuvette (from Minolta) is filled with the granular material to be analyzed (fill height at least 3 cm). The granular material is compacted by pressure from the measurement head of the Minolta instrument.

The whiteness index of the polyester fibers is measured using a Datacolor DC650, according to ISO 18314-1. For this purpose, the polyester fibers in an opaque cluster are analyzed 3 times each against a white and black background. Between the measurements, the specimen is rotated by 90° in each case. The average of the 6 measurements is used to ascertain the tristimulus values X, Y, Z according to ISO 11664-1. Using these, firstly the yellowness index according to ASTM-E313 and secondly the whiteness index according to CIE 15.3 are determined.

Preparation of the Aliphatic-Aromatic Polyester

Inventive Example (I1)

For preparation of the aliphatic-aromatic polyester, 180 kg/h of adipic acid (component (A)), 200 kg/h of terephthalic acid (component (B)) and 290 kg/h of butane-1,4-diol (component (C)) are physically mixed at 35° C. Subsequently, the mixture is transferred continuously to an esterification tank (for example designed as a hydrocyclone as described, for example, in WO 03/042278 A1).

Stage i)

With addition of a further 140 kg/h of butane-1,4-diol (component (C)) and 0.4 kg/h of tetrabutyl orthotitanate (TBOT), the mixture is continuously esterified at a temperature of 240° C. and a pressure of 0.85 bar for a residence time of 1.5 h to obtain an esterification product. The water condensation product that arises and portions of the excess of butane-1,4-diol (component (C)) are distilled off.

Stage ii)

Subsequently, the esterification product obtained in stage i) is guided through a downflow cascade (as described, for example, in WO 03/042278 A1) at a temperature rising from 250 to 260° C. and at a pressure falling from 300 mbar to 10 mbar for a residence time of 2 h, and the predominant portion of excess butane-1,4-diol (component (C)) is distilled off. This precondenses the esterification product obtained in stage i) to obtain a precondensation product.

Stage iii)

After addition of 0.2 kg/h of phosphorous acid dissolved in butane-1,4-diol (component (C)), the precondensation product is transferred in stage iii) into a polycondensation reactor (as described, for example, in EP 0719582) and postcondensed at a temperature of 245° C. and at a pressure of 1 mbar for a further 45 minutes to obtain a postcondensation product. The remaining excess of butane-1,4-diol (component (C)) is distilled off.

Stage iv)

After stage iii), 4 kg/h of hexamethylene diisocyanate (HDI) are metered into the postcondensation product at 240° C. using a static mixing system, and the aliphatic-aromatic polyester is obtained in a polyaddition reaction. The residence time here is 8 minutes. The aliphatic-aromatic polyester is pelletized using underwater pelletization and dried.

The aliphatic-aromatic polyester has a viscosity number of 185 cm$^3$/g and molecular weights $M_w$ and $M_n$ of 128 000 and 34 000 g/mol respectively. In addition, the aliphatic-aromatic polyester has an acid number of 1.2 mg KOH/g. The whiteness index measured according to ASTM E 313-73 of the aliphatic-aromatic polyester is 33.

Comparative Example (C1)

The preparation is analogous to the inventive example (I1), except that the amount of phosphorous acid is lowered to 0.16 kg/h.

The aliphatic-aromatic polyester has a viscosity number of 182 cm$^3$/g and molecular weights $M_w$ and $M_n$ of 127 000 and 33 000 g/mol respectively. In addition, the aliphatic-aromatic polyester has a melt volume flow rate of 3.8 cm$^3$/10 min and an acid number of 0.8 mg KOH/g. The whiteness index measured according to ASTM E 313-73 of the aliphatic-aromatic polyester is 18.

TABLE 1

Whiteness index according to ASTM E313-73
(higher values = whiter/better)

| Example | Whiteness index ASTM E313-73 |
|---|---|
| I1 | 33 |
| C1 | 18 |

By virtue of the higher addition of phosphorous acid in the preparation of the inventive polyester I1, it thus has a higher whiteness index than the polyester from comparative example C1.

Production of the Polyester Fibers

The terephthalate polyester used in all fiber tests was a polyethylene terephthalate (PET) from Invista of the "RT 20" type, which is abbreviated in the examples to the name "PET RT 20".

Inventive Example (I2)

Prior to the spinning, the aliphatic-aromatic polyester according to I1 is dried at a temperature of 80° C. for 8 hours. Prior to the spinning, the PET RT 20 is precrystallized at 120° C. for 8 hours and dried at 160° C. overnight.

PET RT 20 is mixed with an aliphatic-aromatic polyester of the invention which has been obtained by condensation of adipic acid (component (A)), terephthalic acid (component (B)) and butane-1,4-diol (component (C)) according to example 11, and melted in an extruder to obtain a homogeneous melt. The homogeneous melt is subsequently extruded through a 24-hole nozzle with a standard sieve (300 μm) of the extruder, giving polyester fibers (PF).

The amount of the polyethylene terephthalate (PET) used is 94% by weight, and the amount of the aliphatic-aromatic polyester used is 6% by weight, based on the total weight of the PET RT 20 and of the aliphatic-aromatic polyester. The spinning temperature is 280° C.

The color values determined on the fibers I2 obtained are collated in table 2.

Comparative Example (C2)

Prior to the spinning, the aliphatic-aromatic polyester according to C1 is dried at a temperature of 80° C. for 8 hours. Prior to the spinning, the PET RT 20 is precrystallized at 120° C. for 8 hours and dried at 160° C. overnight.

PET RT 20 is mixed with the aliphatic-aromatic polyester C1 which has been obtained by condensation of adipic acid (component (A)), terephthalic acid (component (B)) and butane-1,4-diol (component (C)) according to comparative example C1, and melted in an extruder to obtain a homogeneous melt. The homogeneous melt is subsequently extruded through a 24-hole nozzle with a standard sieve (300 μm) of the extruder, giving polyester fibers (PF).

The amount of the polyethylene terephthalate (PET) used is 94% by weight, and the amount of the aliphatic-aromatic polyester used is 6% by weight, based on the total weight of the polyethylene terephthalate (PET) and of the aliphatic-aromatic polyester. The spinning temperature is 280° C.

The color values determined on the fibers C2 obtained are collated in table 2.

Comparative Example (C3)

Fibers were produced without addition of an aliphatic-aromatic polyester based on PET RT 20.

Prior to the spinning, the PET RT 20 was precrystallized at 120° C. for 8 hours and dried at 160° C. overnight.

PET RT 20 was melted in an extruder to obtain a homogeneous melt. The homogeneous melt was subsequently extruded through a 24-hole nozzle with a standard sieve (300 μm) of the extruder, giving the polyester fibers (PF). The spinning temperature is 290° C.

TABLE 2

Whiteness index and yellowness index of the polyester fibers from examples I2 and C2 and C3.

| Example | Whiteness index according to CIE 15.3 (2004) | Yellowness index according to ASTM E 313 |
|---|---|---|
| I2 | 74.2 | 3.8 |
| C2 | 60.7 | 8.5 |
| C3 | 81.6 | 2.1 |

The polyester fibers (I2) that are produced with the aliphatic-aromatic polyester (I1) of the invention have only a slight deterioration in the whiteness index and the yellowness index compared to the pure polyester fibers from C3. By contrast, the polyester fibers (C2) produced with the aliphatic-aromatic polyester (C1) are much more intensely colored, which can be seen from the significant rise in the yellowness index and the lower whiteness index. In visual terms as well, there is also a distinctly perceptible resultant yellow color in the fiber C2, which is unacceptable for industrial use. Compared to the pure PET fibers C3, the inventive polyester fibers I2 have only a slight deterioration in the whiteness index.

The invention claimed is:

1. An aliphatic-aromatic polyester obtainable by condensation at least of components (A), (B), (C) and optionally (D):
   (A) 40 to 70 mol %, based on components (A) and (B), of adipic acid and/or at least one adipic acid derivative,
   (B) 30 to 60 mol %, based on components (A) and (B), of at least one aromatic 1,ω-dicarboxylic acid and/or at least one 1,ω-dicarboxylic acid derivative,
   (C) 98 to 102 mol %, based on components (A) and (B), of at least one aliphatic 1,ω-diol, and
   (D) 0% to 5% by weight, based on the total weight of components (A) to (C), of at least one chain extender,
wherein the aliphatic-aromatic polyester has a whiteness index according to ASTM E 313-73 of at least 25, and wherein the condensation comprises the four stages i) to iv):
   i) a continuous esterification,
   ii) a precondensation,
   iii) a postcondensation, and
   iv) a polyaddition reaction,
wherein 0.03% to 0.04% by weight of a phosphorus compound is added to the precondensation product obtained in the second stage after process step ii) and before and/or during process step iii), based on the total weight of the precondensation product.

2. An aliphatic-aromatic polyester according to claim 1, wherein the aliphatic-aromatic polyester has a whiteness index according to ASTM E 313-73 of 25 to 40.

3. An aliphatic-aromatic polyester according to claim 1, wherein the aliphatic-aromatic polyester has an acid number measured according to DIN EN ISO 2114:2002-06 in the range from 1.1 to 1.4 mg KOH/g.

4. An aliphatic-aromatic polyester according to claim 1, wherein the aliphatic-aromatic polyester has a viscosity number according to DIN 53728 in the range from 100 to 300 cm$^3$/g.

5. An aliphatic-aromatic polyester according to claim 1, wherein the aliphatic-aromatic polyester is obtainable by condensation at least of components (A), (B), (C) and optionally (D):
   (A) 45 to 65 mol %, based on components (A) and (B), of adipic acid and/or at least one adipic acid derivative,
   (B) 35 to 55 mol %, based on components (A) and (B), of at least one aromatic 1,ω-dicarboxylic acid and/or at least one 1,w-dicarboxylic acid derivative,
   (C) 99 to 101 mol %, based on components (A) and (B), of at least one aliphatic 1,ω-diol, and
   (D) 0.01% to 5% by weight, based on the total weight of components (A) to (C), of at least one chain extender.

6. An aliphatic-aromatic polyester according to claim 1, wherein component (B) is terephthalic acid and/or a terephthalic acid derivative.

7. An aliphatic-aromatic polyester according to claim 1, wherein component (C) is propane-1,3-diol and/or butane-1,4-diol.

8. An aliphatic-aromatic polyester according to claim 1, wherein component (D) is hexamethylene diisocyanate.

9. An aliphatic-aromatic polyester according to a claim 1, wherein the glass transition temperature ($T_G$) of the aliphatic-aromatic polyester is in the range from −50 to 0° C.

10. A process for preparing an aliphatic-aromatic polyester according to claim 1, wherein
   i) in a first stage a mixture comprising components (A), (B) and (C) is continuously esterified in the presence of a catalyst to obtain an esterification product,
   ii) in a second stage the esterification product obtained in the first stage is continuously precondensed up to a viscosity number according to DIN 53728 of 20 to 70 cm$^3$/g to obtain a precondensation product,
   iii) in a third stage the precondensation product obtained in the second stage is continuously postcondensed up to a viscosity number according to DIN 53728 of 60 to 170 cm$^3$/g to obtain a postcondensation product, and
   iv) in a fourth stage the postcondensation product obtained in the third stage is continuously reacted in a polyaddition reaction with the at least one chain extender (D) up to a viscosity number according to DIN 53728 of 100 to 300 cm$^3$/g to obtain the aliphatic-aromatic polyester,
where 0.03% to 0.04% by weight of a phosphorus compound is added to the precondensation product obtained in the second stage after process step ii) and before and/or during process step iii), based on the total weight of the precondensation product.

11. The process according to claim 10, wherein stages i) and ii) are conducted in the presence of a titanium catalyst.

12. The process according to claim 10, wherein the phosphorus compound is phosphorous acid.

13. Polyester fibers (PF) each comprising, based on the total weight of the polyester fibers (PF),
   80% to 99% by weight of at least one terephthalate polyester,
   1% to 20% by weight of at least one aliphatic-aromatic polyester according to claims 1 to 9, and
   0% to 5% by weight of at least one additive (E),
   wherein the polyester fibers (PF) have a whiteness index according to CIE 15.3 of at least 65.

14. Polyester fibers (PF) according to claim 13, wherein the at least one terephthalate polyester is polyethylene terephthalate (PET) and/or polybutylene terephthalate (PBT).

15. An aliphatic-aromatic polyester obtainable by a process according to claim 10.

* * * * *